Patented Apr. 26, 1938

2,115,214

UNITED STATES PATENT OFFICE 2,115,214

COATING COMPOSITION

Clifford Jay Rolle, Yonkers, N. Y., assignor to Ault & Wiborg Corporation, New York, N. Y., a corporation of Ohio No Drawing. Application July 30, 1936, Serial No. 93,461

7 Claims. (Cl. 91—70)

This invention relates to liquid coating compositions and to films produced therefrom. More particularly, the invention relates to finishing compositions containing resinous products resulting from the polymerization of vinyl compounds, and adapted to use in the finishing, protection, and decoration of the surfaces of metals.

The bases of the coating compositions of the present invention comprise the synthetic vinyl resins which are produced by the conjoint polymerization of vinyl halide and vinyl ester of an aliphatic acid, or, more specifically, resins which are produced by the polymerization of vinyl chloride and the vinyl acetate while these materials are in mutual contact. In the production of the resinous products the proportion of vinyl chloride to vinyl acetate and also the conditions under which the components are polymerized, determine the properties of the final resinous mass.

The vinyl resins of various types have been known for an appreciable period of time, and, have been proposed and in some cases, actually used, for a wide variety of purposes. While the vinyl resins seem to possess many desirable qualities, such as resistance to the attack of acids and alkalis, resistance to moisture, and the capacity to produce hard films having good wearing qualities, still, the films produced from these resins usually are too hard and too brittle to be employed in the coating of the surfaces of metals, especially when the metals are to be worked or formed after they have been finished or decorated. One of the primary difficulties in this respect, has been the impossibility, heretofore, of obtaining a bond, between the coating film and the metal surface, sufficiently adhesive and strong to permit the metal to be handled in any other than a relatively delicate manner.

On the other hand, it is the conventional practice in metal coating processes to apply the coating, either by means of a roller or by spraying or, in some instances, by dipping. When vinyl resins, relatively high in chloride content, are employed in the coating composition, baking or heat treatment of the applied film usually is necessary. One of the more important difficulties, which has been encountered in the use of the vinyl resins in coating compositions, is that the final film does not flow or spread evenly under the influence of heat, that is, during the baking operation. The film rather exhibits a tendency to assume an excessive "orange peel" formation. The orange peel formation detracts from the final appearance of the film and causes the film to lack the pleasing appearance of depth which is desied. The term "orange peel", as it is used in the present specification, refers primarily to a film formation which presents an appearance similar to the appearance of actual orange peel, that is to say, small bumps or pebble-like formations seem to form, relatively uniformly, over the film surface.

It is frequently highly desirable in the manufacture of formed articles such as caps, container closures and the like, and other articles shaped by pressing, first to coat the metal while it is in the sheet form, then to conduct the stamping, forming, or other configurating operation. The vinyl resins of the type described unfortunately do not possess the capacity to adhere tightly to the surfaces of metals, and particularly those of the type of tin. This characteristic rather severely has limited the use of the vinyl products in the metal fabricating arts, when it has been desired first to coat sheets of metal, then fabricate these sheets into the desired objects. When the adhesion of the coating composition covering the metal is poor, the film parts from the metal during the disrupting or forming operations. On the other hand, if the coating composition becomes brittle after it has been applied to the metal and baked thereon, the film tends to crack, or, in some instances, flake from the metal surface during the manufacturing stage of the process. Consequently, while the vinyl resins are known to possess rather remarkable qualities of resistance to humidity, grease, acids, alkalis, iodine, and similar reagents of the type commonly used in testing finishes, nevertheless these products have not enjoyed the wide-spread use which their superficial qualities would seem to warrant.

It is the object of this invention to provide a film of which a principal constituent is vinyl resin, which film possesses the characteristics of hardness, durability, toughness, transparency, luster, smoothness of surface, and freedom from "orange peel" formation, and, particularly the capacity to adhere and bond substantially permanently to a metal surface on which the film is present.

A further object of the invention is to provide finishing compositions, of the type of enamels and lacquers, that may be applied to metal by roller coating, by spraying, or by dipping to provide films, as aforesaid, which possess a continuous, smooth, unbroken appearance, and which are integrated with the metal to which they are applied to a degree sufficient to permit of subsequent deformation and configuration of the metal.

The present invention is predicated upon the discovery and determination that the chlorinated derivatives of diphenyl possess unique capacity, as plasticizers for vinyl resins, to impart to coating compositions in which the resins are present, the unusual qualities of adhesion, miscibility with conventional solvents, and the tendency to flow, spread, and dry to a smooth film under the influence of heat. The surfaces of these films or coatings possess a gloss or luster which is glasslike, rather than pebbled or like orange peel, while, at the same time, the films are bonded to the metal surfaces almost as integral parts thereof, rather than as superficial coatings of the undesirable type common in the past.

It is the concept of the present invention, therefore, to provide enamels and lacquers comprised of vinyl resins plasticized with chlorinated derivatives of diphenyl, which films are adherent to the surfaces of metals to the degree necessary to permit the metals to be worked or configurated after coating, and which, also, dry to a hard, lustrous, smooth, wear-resistant state.

Theoretically, any material, solid or semi-solid, which would form a solid solution with a vinyl resin at an ordinary temperature, and which would fuse sufficiently at a baking temperature to permit flow, should function to solve the problem of orange peel. The baking temperature, particularly in the case of white and light colors, usually is limited to about 275° to 280° F. Extensive tests with the conventional types of plasticizers, heretofore proposed for use in conjunction with vinyl resins, that is to say, material such as tricresyl phosphate, dibutyl phthalate, and various high boiling solvents and the like, have failed to produce the desired results.

On the other hand, in accordance with the present invention, the chlorinated derivatives of diphenyl, in relatively small quantities, have been found to accomplish the improvements desired. The chlorinated derivatives of diphenyl are polymerization products, and, as is frequently the case in such instances, the physical and chemical characteristics of the products vary largely in accordance with the degree of polymerization. The materials, from the commercial point of view, usually are sold under the trade name "Arochlor" by the Monsanto Chemical Company. In the practice of the present invention I have determined that Arochlor No. 1254 is suited to use in the majority of situations and is, therefore, as a general rule, a preferred product. As an example the properties of these materials are illustrated as follows:

Color_____Pale yellow
Viscosity (#3 Ford cup
  @ 25° C.)_____1650 sec.
Distillation range_____About 350°–380° C.
Specific gravity @ 25° C_____1.54 to 1.55
Flash point (open cup)_____None
Refractive index @ 20° C_____1.6405 to 1.6410
Pour point_____8° to 13° C.

The invention is disclosed, therefore, in relation to this material, as a practical embodiment of use, although the other polymers of chlorinated diphenyl have been found to exhibit similar plasticizing qualities, but in some instances to a less marked degree.

The ratio of chlorinated derivative of diphenyl as a plasticizing agent for vinyl resins may vary from about 50 parts of plasticizer and about 50 parts of vinyl resin to about 10 parts of plasticizer and about 90 parts of vinyl resin. The preferred ratio is approximately 40 parts of plasticizer to approximately 60 parts of vinyl resin. When a hard film is required and a high degree of adhesion and flexibility are considerations which are relatively secondary in importance, the amount of chlorinated diphenyl will be relatively small. On the other hand, where a high degree of adhesion and a high degree of flexibility are required, and the hardness of the film is not of primary importance, the parts of plasticizer may approach equality with the parts of vinyl resin. In the ratio which is preferred, as is indicated above, balance of the optimum conditions is exemplified. The use of these plasticizers is particularly desirable in view of the fact that they have been found to be nearly as resistant to the usual testing reagents as the vinyl resins, themselves. Consequently, the desirable qualities of the vinyl resins are retained, while their undesirable qualities as finishing composition ingredients, are eliminated.

In the decoration or coating of metal, the method of application, which is employed most extensively, is the roller coating method. In this method, the metal in sheet form is passed beneath a cylindrical roller to which the coating liquid is fed. During the passage, a film of liquid is disposed over the surface of the sheet, and the sheet is passed to the drying stage of the operation, or to the baking oven, as the case may be. The depth of film applied in this manner varies in accordance with the viscosity of the finishing material, the speed of the roll, the feed of liquid to the roll, and the spacing of the roll from the sheet. As an example, a typical formula for a green roller coat enamel is approximately as follows:

| | Pounds |
|---|---|
| Vinylite "H"_____ | 16.80 |
| "Arochlor 1254"_____ | 12.60 |
| Solvent naphtha_____ | 17.70 |
| Toluol_____ | 17.70 |
| High boiling ketones_____ | 33.05 |
| Dibutyl phthalate_____ | 2.15 |
| Green lake paste_____ | 5.0 |

In preparing the finishing compositions of my invention for roller coating application, I prefer to use Vinyloid H H resin, which is the conjoint polymerization product of vinyl chloride and vinyl acetate, that is, the vinyl polymer contains both vinyl chloride and vinyl acetate in the same molecule. The proportion of vinyl chloride in Vinyloid H H is approximately 87%.

In the case of finishing compositions adapted to be applied by spraying, the viscosity of the final product is a relatively important consideration and should be taken into account. The adjustment in the types and quantities of vinyl resins in the formulation of compositions adapted to be used for particular purposes is well within the comprehension of those skilled in the art. Typical formulations for spray coatings are exemplified as follows:

*Spraying white Vinyloid enamel*

| | |
|---|---|
| Titanium dioxide_____ | 10.2 |
| Supersublimed white lead_____ | 1.1 |
| Vinyloid H_____ | 9.0 |
| Arochlor 1254_____ | 7.0 |
| Dibutyl cellosolve phthalate_____ | 3.4 |
| Methyl iso-butyl ketone_____ | 30.0 |
| Di propyl ketone_____ | 5.3 |
| Xylol_____ | 6.0 |
| Toluol_____ | 28.0 |

As a general rule, the greater the quantity of chlorinated derivative of diphenyl which is used to plasticize a given composition, the greater the extent of the improvement which is accomplished. It will be understood, of course, that the quantity of plasticizer to be used in a composition adapted to be baked will vary somewhat in accordance with the temperature to which the baking is conducted. Usually, baking at 250° F. for about two hours, to 325° F. for about twenty minutes is satisfactory.

Generally speaking, it is preferred in the finishing of metal subsequently to be formed, as by stamping, first to coat the metal with a coat of standard primer, first coater, or size. It is one of the distinct contributions to the art that the use of chlorinated diphenyl derivative in vinyl resin makes unnecessary the use of a primer, thereby both increasing the speed of handling and lowering the cost. In my preferred finishing compositions, I apply the material to the bare metal either by spraying, dipping or roller coating and baking at the proper temperature, as indicated above.

In the formulation of the finishing compositions of my invention, pigmentation may be conducted in the usual manner. Likewise, the reduction of the viscosity of a given composition is accomplished with the use of conventional solvents in the manner understood by those skilled in the art. It may be noted that the plasticizers of the present invention, in many finishing compositions, function somewhat in the nature of solvents, to promote the miscibility of vinyl resins with conventional solvents of the type of di chlor ethyl ether, methyl cyclohexanone, methyl ethyl ketone, hexone, and butrone. Moreover, the plasticizers function to cause flow of the film coatings during the baking operation, so that smoothness of surface and a high degree of luster is imparted to the finished film.

The plasticizers, which have been used in the art prior to my invention, have been relatively expensive, yet not satisfactory. On the other hand, the chlorinated derivatives of diphenyl are inexpensive and consequently very economical to use. From the foregoing, therefore, it will be seen that I have provided a novel composition adapted to be used in the roller coating and spraying and dipping coating of metals and the like, embodying characteristics which are highly desirable but not expensive.

I have described herein preferred embodiments of the invention in relation to a composition possessed of the capacity to provide a film comprised of vinyl resins substantially integrated with a sheet of metal and plasticized with the chlorinated derivatives of diphenyl, yet it will be understood that the compositions of the invention also may be employed in the coating of surfaces other than metal surfaces, and that the various modifications to which the invention is susceptible are included within the scope of the appended claims.

Having described my invention, I claim:

1. A baking enamel containing a resin consisting of the conjoint polymer of vinyl acetate and vinyl chloride in which the proportion of vinyl chloride is in excess of the vinyl acetate and containing liquid chlorinated diphenyl as a plasticizer for the vinyl resin, and solvent and pigment, the proportions of the ingredients being such that a baked film of the composition upon metal, is free from orange peel formations, and is capable of being bent with the metal without cracking or flaking during forming and configurating operations.

2. A liquid baking finishing composition containing a resin consisting of the conjoint polymer of vinyl acetate and vinyl chloride in which the proportion of vinyl chloride is in excess of the vinyl acetate and containing liquid chlorinated diphenyl as a plasticizer for the vinyl resin, and solvent, the proportions of the ingredients being such that a baked film of the composition upon metal, is free from orange peel formations, and is capable of being bent with the metal without cracking or flaking during forming and configurating operations.

3. A baking enamel containing a resin consisting of the conjoint polymer of vinyl acetate and vinyl chloride in which the proportion of vinyl chloride is in excess of the vinyl acetate, and containing liquid chlorinated diphenyl and dibutyl phthalate as plasticizers for the vinyl resin, and solvent and pigment, the proportions of the ingredients being such that a baked film of the composition, upon metal, is free from orange peel formation and is capable of being bent with the metal without cracking or flaking during the forming and configurating operations of the metal.

4. A metal article coated with a baked enamel consisting of the conjoint polymer of vinyl acetate and vinyl chloride in which the proportion of vinyl chloride is in excess of the vinyl acetate and containing chlorinated diphenyl as a plasticizer for the vinyl resin, the proportion of the chlorinated diphenyl plasticizer to vinyl resin being such that the baked film of the composition upon the metal is free from orange peel formations and is capable of being bent with the metal without cracking or flaking during forming and configurating operations thereof.

5. A liquid baking finishing composition containing a resin consisting of the conjoint polymer of vinyl acetate and vinyl chloride in which the proportion of vinyl chloride is in excess of the vinyl acetate, and containing liquid chlorinated diphenyl and dibutyl phthalate as plasticizers for the vinyl resin, and solvent, the portions of the ingredients being such that a baked film of the composition, upon metal, is free from orange peel formation and is capable of being bent with the metal without cracking or flaking during the forming and configurating operations of the metal.

6. A baking enamel containing a resin consisting of the conjoint polymer of a vinyl acetate and vinyl chloride in which the proportion of vinyl chloride is in excess of the vinyl acetate, and containing liquid chlorinated diphenyl as a plasticizer for the resin in the proportion of approximately 10 to 50 parts of plasticizer to 90 to 50 parts of resin, so that a baked film of the composition upon metal, is free from orange peel formations and is capable of being bent with the metal without cracking or flaking during forming and configurating operations.

7. A baking enamel containing a resin consisting of the conjoint polymer of vinyl chloride and vinyl acetate in which the proportion of vinyl chloride is in excess of the vinyl acetate, and containing a liquid chlorinated diphenyl polymer and solvent, the proportions of the ingredients being such that a baked film of the composition, upon metal, is free from orange peel formations, and is capable of being bent with the metal without cracking or flaking during forming and configurating operations.

CLIFFORD JAY ROLLE.